US009589064B2

(12) United States Patent
Ma et al.

(10) Patent No.: US 9,589,064 B2
(45) Date of Patent: Mar. 7, 2017

(54) METHOD, DEVICE AND SYSTEM FOR RECOMMENDING ACCESS IP ADDRESS OF SERVER, SERVER AND STORAGE MEDIUM

(71) Applicant: Tencent Technology (Shenzhen) Company Limited, Guangdong (CN)

(72) Inventors: Tongxing Ma, Guangdong (CN); Lin Pan, Guangdong (CN); Ronghua Yang, Guangdong (CN); Jianguo Dang, Guangdong (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 310 days.

(21) Appl. No.: 14/338,409

(22) Filed: Jul. 23, 2014

(65) Prior Publication Data
US 2014/0330897 A1    Nov. 6, 2014

Related U.S. Application Data

(63) Continuation of application No. PCT/CN2013/090908, filed on Dec. 30, 2013.

(30) Foreign Application Priority Data

Apr. 11, 2013   (CN) .......................... 2013 1 0125439

(51) Int. Cl.
*G06F 15/16*      (2006.01)
*G06F 17/30*      (2006.01)
*H04L 29/08*      (2006.01)

(52) U.S. Cl.
CPC .......... *G06F 17/3089* (2013.01); *H04L 67/18* (2013.01); *H04L 67/327* (2013.01)

(58) Field of Classification Search
CPC ....... H04L 29/12; H04L 67/327; H04L 67/18; H04L 61/2007; G06F 17/30; G06F 17/3089
See application file for complete search history.

(56) References Cited

U.S. PATENT DOCUMENTS

| 7,254,626 | B1 | 8/2007 | Kommula et al. |
| 2005/0110654 | A1* | 5/2005 | Kitano .................. G01C 21/26 340/13.24 |
| 2009/0049540 | A1* | 2/2009 | Khalil ..................... H04L 67/20 726/14 |
| 2012/0291072 | A1* | 11/2012 | Maddison ........... G06F 17/3087 725/53 |

FOREIGN PATENT DOCUMENTS

| CN | 101132393 A | 2/2008 |
| CN | 101257386 A | 9/2008 |

(Continued)

OTHER PUBLICATIONS

International Search Report and the Written Opinion of the International Searching Authority, PCT/CN2013/090908, Tencent Technology (Shenzhen) Company Limited, Mar. 27, 2014.

(Continued)

*Primary Examiner* — Benjamin M Thieu
(74) *Attorney, Agent, or Firm* — McDonald Hopkins LLC (57) ABSTRACT

A method, device and system for recommending an access IP address of a server, a server and a storage medium are provided, wherein the method includes: receiving a request for recommending a server from a client, wherein the request for recommending a server includes an IP address of the client and account information of a user of the client; designating the recommended server according to the IP address and the account information; ranking a plurality of IP addresses associated with the recommended server according to ranking parameters so as to generate an IP address list composed of the ranked IP addresses, wherein the IP addresses associated with the recommended server include a local IP address of the recommended server and IP addresses of transit servers which have accessed the recommended server; and sending the IP address list to the client.

12 Claims, 3 Drawing Sheets

(56) References Cited

FOREIGN PATENT DOCUMENTS

| CN | 101710905 | 5/2010 |
| CN | 101931999 | 12/2010 |
| CN | 102316172 A | 1/2012 |
| CN | 102572736 | 7/2012 |
| CN | 103002069 | 3/2013 |
| CN | 103188270 | 7/2013 |

OTHER PUBLICATIONS

Abstract of Chinese Patent Application No. CN101710905, Address Resolution Control Method and System Based on Tactics, May 19, 2010.
Abstract of Chinese Patent Application No. CN101931999, Service Access Method, Portal Switching Server and Service Access System, Dec. 29, 2010.
Abstract of Chinese Patent Application No. CN102572736, Inquiring and Sending Methods, Device and System for Hot Information, Jul. 11, 2012.
Abstract of Chinese Patent Application No. CN103002069, Domain Name Resolution Method, Device and System, Mar. 27, 2013.
Abstract of Chinese Patent Application No. CN103188270, Method, Device and System for Accessing Recommended Server to IP Address, Jul. 3, 2013.
State Intellectual Property Office of People's Repulic of China, Notification of First Office Action for Patent Application No. 2013101254392, report issue date Mar. 13, 2014, 10 pgs., China.

* cited by examiner

METHOD, DEVICE AND SYSTEM FOR RECOMMENDING ACCESS IP ADDRESS OF SERVER, SERVER AND STORAGE MEDIUM

CROSS-REFERENCE TO RELATED APPLICATIONS

This application claims priority to and is a continuation application of PCT/CN2013/090908, filed on Dec. 30, 2013 and entitled "METHOD, DEVICE AND SYSTEM FOR RECOMMENDING ACCESS IP ADDRESS of SERVER, SERVER AND STORAGE MEDIUM", which claims priority to Chinese Patent Application No. 201310125439.2, filed on Apr. 11, 2013 by Tencent Technology (Shenzhen) Company Limited and entitled "Method, Device and System for Recommending Access IP Address of Server", which are incorporated herein by reference in their entirety.

FIELD OF THE INVENTION

The present disclosure relates to the field of computer technologies, particularly to the field of Internet technologies, more particularly to a method, device and system for recommending an access IP address of a server to a client, a server and a storage medium.

BACKGROUND OF THE INVENTION

This section provides background information related to the present disclosure which is not necessarily prior art.

With the development of communication technologies, particularly Internet technologies, network bandwidths available to users are continuously increased, and more and more network applications emerge. So far, online games are hot points of the network application research and development.

Figure 1:
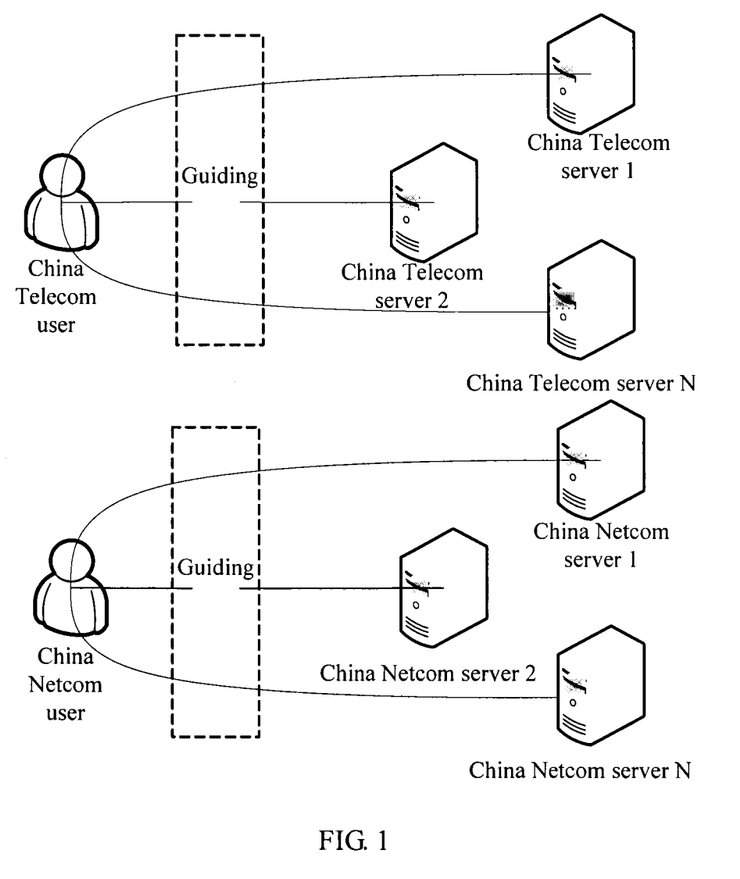
FIG. 1 is a schematic diagram of performing partition guiding on game users according to network operators realized in the prior art.

One of core contents of online games includes interaction and communication between people in virtual network world. Online games are virtually, but Internet infrastructure is realistic, and unsmooth network intercommunication among all network operators is always an important problem in the development and design process of online games. To enable players to have good game experience, the online games usually guide game users of different network operators to enter game zones of respective network operators. Refer to FIG. 1, FIG. 1 is a schematic diagram of performing partition guiding on the game users according to the network operators; and in the FIG. 1, the online games guide China Telecom users to enter game zones operated by China Telecom and guide China Netcom users to enter game zones operated by China Netcom. More specifically, for example, by deploying one or more groups of China Telecom servers in China Telecom Internet Data Center (IDC), the online games guide the China Telecom users to select the group of servers to play the games through a login interface.

However, solution to the partition guiding has the following disadvantages: firstly, no regional factor is considered when the users of different operators are guided, and the users may not access nearby game servers; and moreover, when one kind of servers (such as servers of China Telecom) needs to provide service to users (such as China Netcom users) of other kinds of operators, the quality of provided network services may be poor due to unsmooth network intercommunication.

SUMMARY OF THE INVENTION

In view of the above problems, the present disclosure provides an improved method, device and system for recommending an access IP address of a server to a client, a server and a storage medium so as to solve the technical problems mentioned in the background of the present disclosure.

The present disclosure provides a method for recommending an access IP address of a server to a client, including:

receiving a request for recommending a server from a client, wherein the request for recommending a server includes an IP address of the client and account information of a user of the client;

designating a recommended server according to the IP address and the account information;

ranking a plurality of IP addresses associated with the recommended server according to ranking parameters so as to generate an IP address list composed of the ranked IP addresses, wherein the IP addresses associated with the recommended server include a local IP address of the recommended server and IP addresses of transit servers which have accessed the recommended server; and sending the IP address list to the client.

The present disclosure provides a device for recommending an access IP address of a server to a client, which includes at least a processor operating in conjunction with a memory and a plurality of units, wherein the plurality of units include:

a request receiving unit, configured for receiving a request for recommending a server from a client, wherein the request for recommending a server includes an IP address of the client and account information of a user of the client;

a designating unit, configured for designating the recommended server according to the IP address and the account information;

a ranking unit, configured for ranking a plurality of IP addresses associated with the recommended server according to ranking parameters so as to generate an IP address list composed of the ranked IP addresses, wherein the IP addresses associated with the recommended server comprise a local IP address of the recommended server and IP addresses of transit servers which have accessed the recommended server; and a sending unit, configured for sending the IP address list to the client.

The present disclosure provides a system for recommending an access IP address of a server to a client, including:

a client, configured for sending a request for recommending a server to a recommending device, wherein the request for recommending a server includes an IP address of the client and account information of a user of the client;

the recommending device, including a request receiving unit, a designating unit, a ranking unit and a sending unit, wherein the request receiving unit is configured for receiving the request from the client;

the designating unit is configured for designating the recommended server according to the IP address and the account information in the request for recommending a server;

the ranking unit is configured for ranking a plurality of IP addresses associated with the recommended server according to the ranking parameters to generate an IP address list composed of the ranked IP addresses, wherein the IP addresses associated with the recommended server include a local IP address of the recommended server and IP addresses of transit servers which have accessed the recommended server; and the sending unit is configured for sending the IP address list to the client.

The present disclosure provides A server, which includes at least a processor operating in conjunction with a memory and a plurality of units, wherein the plurality of units include:

a request receiving unit, configured for receiving a request for recommending a server from the client, wherein the request for recommending a server comprises an IP address of the client and account information of the user of the client;

a designating unit, configured for designating a recommended server according to the IP address and the account information;

a ranking unit, configured for ranking a plurality of IP addresses associated with the recommended server according to the ranking parameters so as to generate an IP address list composed of the ranked IP addresses, wherein the IP addresses associated with the recommended server comprise a local IP address of the recommended server and IP addresses of transit servers which have accessed the recommended server; and a sending unit, configured for sending the IP address list to the client.

The present disclosure provides a non-transitory storage medium including computer-executable instructions which, wherein the computer executable instructions, when being executed by a computer processor, are configured for performing a method for recommending the access IP address of the server to the client, wherein the method for recommending the access IP address of the server to the client includes:

receiving a request for recommending a server from a client, wherein the request for recommending a server comprises an IP address of the client and account information of a user of the client;

designating a recommended server according to the IP address and the account information;

ranking a plurality of IP addresses associated with the recommended server according to ranking parameters so as to generate an IP address list composed of the ranked IP addresses, wherein the IP addresses associated with the recommended server comprise a local IP address of the recommended server and IP addresses of transit servers which have accessed the recommended server; and sending the IP address list to the client.

With the method, device and system for recommending an access IP address of a server to a client, the server and the storage medium provided by the present disclosure, by designating the recommended server among servers capable of providing services to the client at present, and ranking the plurality of IP addresses associated with the designated recommended server, IP address, which ranks higher, have the higher probability of being selected by the client for carrying out an access attempt to the recommended server, and whether the server is recommended or the ranking of the IP addresses are both performed based on factors such as geographical regions, operators, local IP addresses of servers, etc. therefore, the purposes of accessing the nearby servers by the client and saving network flow are achieved.

DETAILED DESCRIPTION OF THE EMBODIMENTS

The present disclosure is further described below in details with reference to accompanying drawings and embodiments. It can be understood that the described specific embodiments are just used for describing the present disclosure rather than limiting the present disclosure. In addition, it is noted that only parts related to the present disclosure but not all contents are illustrated in the accompanying drawings in order to facilitate description.

Figure 2:
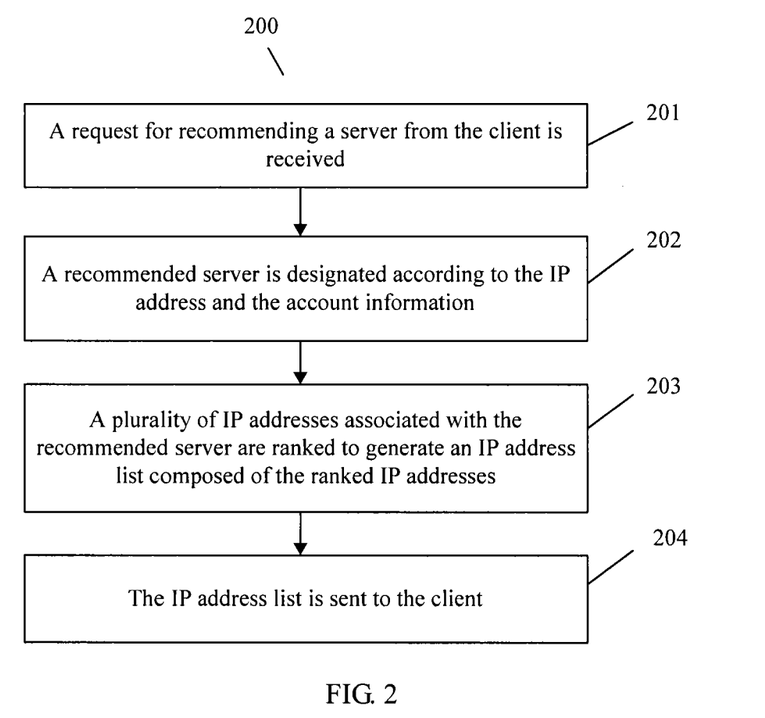
FIG. 2 is a flow chart of a method for recommending an access IP address of a server to a client provided in the first embodiment of the present disclosure.

FIG. 2 shows a first embodiment of the present disclosure.

FIG. 2 is a flow chart of a method for recommending an access IP address of a server to a client provided in the first embodiment of the present disclosure, and a flow 200 of the method for recommending a server to a client includes steps 201-204.

At step 201, a request for recommending a server from the client is received.

In the first embodiment, a server (such as a recommending server recommending suitable game servers for the game client) that processes the request from the client may receive the request for recommending a server from the client in a wired connection manner or a wireless connection manner, wherein the recommended server is offstage server providing services to applications (such as game application and chat application) of the client, while the request for recommending a server includes an IP address of the client and account information of the user of the client. The account information of the user includes one or more of: account information used when the user logs in, such as game account, QQ number, credit card account, insurance account, living payment account, and so on; related information of verification, such as password information and verification information; related information of identity, such as age information and occupational information; and related information of applications used by the user, such as name of game application (such as Chinese poker), playing rules (such as challenge match), and grade or scores of the user in applications, etc.

In this embodiment, the wireless connection manner includes, but is not limited to, 3G connection, WiFi connection, Bluetooth connection, WiMAX connection, Zigbee connection, UWB (ultra wideband) connection or other wireless connection manners to be developed in the future.

At step 202, a recommended server is designated according to the IP address and the account information.

In the first embodiment, a server (such as the recommending server) processing the request from the client is configured for identifying a geological region where the client is and a network operator providing network services to the client according to the IP address included in the request from the client; and then the server designates the recommended server among the servers capable of providing services to the client at present on the basis of recommendation strategies according to the geological region, the network operator and the account information.

In this embodiment, the recommendation strategies may include a ranking strategy, for example, for the servers capable of providing services to the client at present, if the network operator to which the server affiliates and the network operator providing network services to the client are the same operator, the server ranks higher; if both the server and the client are within the same geological region, the server ranks higher; and if related information (such as user grade and user scores in the game application, etc.) of applications used by the user, obtained from the account information of the user, and related information of same applications provided by the server are high in matching degree (for example, the grades or scores of other users of the same application logging in the server are equivalent), the server ranks higher.

At step 203, a plurality of IP addresses associated with the recommended server are ranked to generate an IP address list composed of the ranked IP addresses.

In the first embodiment, a server (such as the recommending server) processing the request from the client ranks the plurality of IP addresses associated with the designated recommended server at step 202 according to ranking parameters to generate the IP address list composed of the ranked IP addresses. The IP addresses associated with the recommended server include a local IP address of the recommended server and IP addresses of transit servers which have accessed the recommended server.

In this embodiment, the ranking parameters include ranking items and the respective weighted values corresponding to the ranking items. The ranking items, for each IP address associated with the recommended server, include that whether the geological region corresponding to the IP address is the same as the geological region where the client is, whether the network operator corresponding to the IP address is the same as the network operator for providing network services to the client, and whether the IP address is the local address of the recommended server.

In this embodiment, that the server processing the request from the client ranks the IP addresses associated with the recommended server according to the ranking parameters may be performed as follows:

firstly, giving out ranking scores of the ranking items of each of the plurality of IP addresses one by one, for example, if the geological region corresponding to the IP address is the same as the geological region where the client is, the ranking score of the ranking item is 1, otherwise the ranking score is 0; if the network operator corresponding to the IP address is the network operator for providing network services to the client, the ranking score of the ranking item is 1, otherwise the ranking score is 0; and if the IP address is the local IP address of the recommended server, the ranking score of the ranking item is 1, otherwise the ranking score is 0;

then, in combination with the weighed values corresponding to the ranking items, a plurality of corresponding ranking scores of the ranking items of each IP address are weighted summation so as to obtain total score of the ranking scores of the IP address; and finally, the plurality of IP addresses are ranked in a descending order according to the total score of the ranking scores of each IP address so as to obtain a list of the plurality of IP addresses, that is, the IP address list.

At step 204, the IP address list is sent to the client.

In the first embodiment, a server (such as the recommending server) processing the request from the client sends the IP address list generated at step 203 to the client in a wired connection manner or a wireless connection manner, wherein the higher the IP address in the IP address list is, the more preferable for the client is, that is to say, the higher the probability of being selected by the client for carrying out an access attempt to the recommended server is.

In the method provided in this embodiment of the present disclosure, by designating the recommended server among servers configured for providing services to the client at present according to the recommendation strategies, and then ranking the plurality of IP addresses associated with the designated recommended server according to the ranking parameters, the higher the IP address ranks, the higher the probability of being selected by the client for carrying out an access attempt to the recommended sever is. This contributes to improve the efficiency of accessing the sever (for example, the access success rate is improved since the server of the same operator is accessed preferably), and to save the network flow (for example, if the access IP address selected by the client and the IP address of the client correspond to the same geological region and the same operator, and the access IP address is also the local IP address of the recommended server, the network flow of a metropolitan area network is greatly saved).

Figure 3:
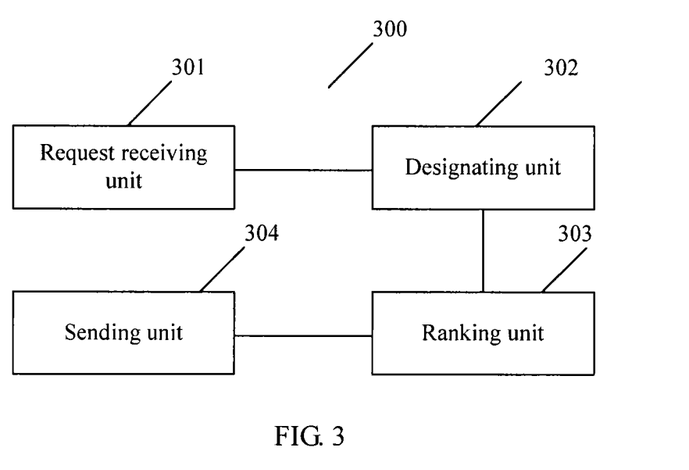
FIG. 3 is a structural schematic diagram of a device for recommending an access IP address of a server to a client provided in the second embodiment of the present disclosure.

FIG. 3 shows a second embodiment of the present disclosure.

FIG. 3 is a structural schematic diagram of a device for recommending an access IP address of a server to a client provided in the second embodiment of the present disclosure. The device for recommending an access IP address of a server to a client may be a server. As shown in FIG. 3, a device 300 for recommending an access IP address of a server to a client in this embodiment includes at least a processor operating in conjunction with a memory and a plurality of units. Wherein the plurality of units include a request receiving unit 301, a designating unit 302, a ranking unit 303 and a sending unit 304. wherein, the request receiving unit 301 is configured for receiving a request for recommending a server from the client, the request for recommending a server includes an IP address of the client and account information of a user of the client; the designating unit 302 is configured for designating the recommended server according to the IP address and the account information in the request for recommending a server received by the request receiving unit 301; the ranking unit 303 is configured for ranking a plurality of IP addresses associated with the recommended server designated by the designating unit 302, according to the ranking parameters so as to generate an IP address list composed of the ranked IP addresses, wherein the IP addresses associated with the recommended server include a local IP address of the recommended server and IP addresses of transit servers which have accessed the recommended server; and the sending unit 304 is configured for sending the IP address list generated by the ranking unit 303 to the client.

In the second embodiment, the request receiving unit 301 may receive the request for recommending a server from the client in a wired connection manner or a wireless connection manner, wherein the recommended server is offstage server configured for providing services to applications of the client (such as game application and chat application), while the request for recommending a server includes an IP address of the client and account information of a user of the client. The account information of the user includes one or more of: account information used for logging in of the user, such as game account, QQ account number, credit card account, insurance account, living payment account and so on; verification-related information, such as password information, verification information and so on; identity-related information, such as age information and occupational information and so on; and applications-related information used by the user, such as name of game application (such as Chinese poker), playing rules (such as challenge match), and grade or scores of the user in applications, etc.

In the second embodiment, the designating unit 302 may identify the geological region where the client is and the network operator providing network services to the client according to the IP address included in the request from the client; and then the designating unit 302 designates the recommended server among the servers capable of providing services to the client at present on the basis of recommendation strategies according to the geological region, the network operator and the account information.

In the second embodiment, the ranking unit 303 is configured for ranking a plurality of IP addresses associated with the recommended server designated by the designating unit 302 according to the ranking parameters so as to generate the IP address list composed of the ranked IP addresses, wherein the IP addresses associated with the recommended server include the local IP address of the recommended server and the IP addresses of the transit servers which have accessed the recommended server. In this embodiment, the ranking parameters include ranking items and weighted values corresponding to the ranking items, for each IP address associated with the recommended server, wherein the ranking items include whether the geological region corresponding to the IP address is the geological region where the client is, whether the network operator corresponding to the IP address is the network operator providing network services to the client, and whether the IP address is the local address of the recommended server.

In the second embodiment, the sending unit 304 is configured for sending the IP address list generated by the ranking unit 303 to the client in a wired connection manner or a wireless connection manner. Wherein, the IP address ranking higher in the IP address list is more preferable for the client, that is, it has higher probability that the IP address ranking higher in the IP address list can be selected by the client for carrying out an access attempt to the recommended server.

Figure 4:
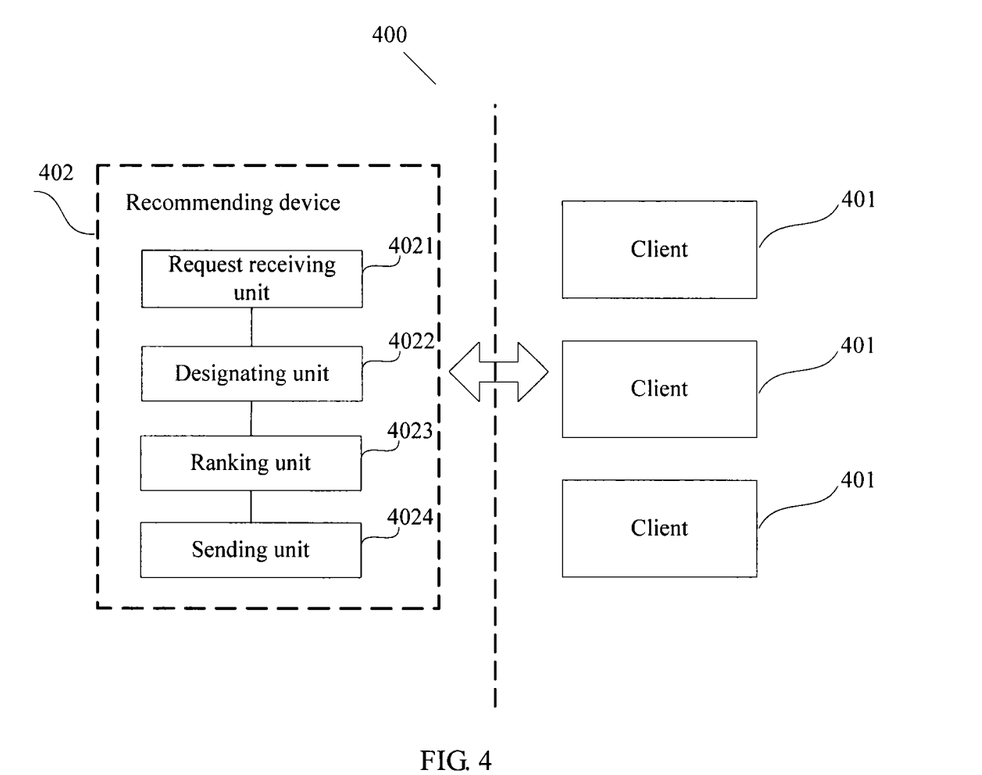
FIG. 4 is a structural schematic diagram of a system for recommending an access IP address of a server to a client provided in the third embodiment of the present disclosure.

FIG. 4 shows a third embodiment of the present disclosure.

FIG. 4 is a structural schematic diagram of a system for recommending an access IP address of a server to a client provided in the third embodiment of the present disclosure. As shown in FIG. 4, the system 400 for recommending an access IP address of the server to the client according to this embodiment includes a recommending device 402 (such as a recommending server recommending suitable game servers for the game client) and a client 401, wherein the client 401 is configured for sending a request for recommending a server to the recommending device 402, wherein the recommending device 402 includes a request receiving unit 4021, a designating unit 4022, a ranking unit 4023 and a sending unit 4024.

The request receiving unit 4021 is configured for receiving the request for recommending a server from the client 401; the designating unit 4022 is configured for designating the recommended server according to the IP address and the account information in the request for recommending a server received by the request receiving unit 4021; the ranking unit 4023 is configured for ranking a plurality of IP addresses associated with the recommended server designated by the designating unit 4022 according to the ranking parameters so as to generate an IP address list composed of the ranked IP addresses, wherein the IP addresses associated with the recommended server include a local IP address of the recommended server and IP addresses of transit servers which have accessed the recommended server; and the sending unit 4024 is configured for sending the IP address list generated by the ranking unit 4023 to the client.

Each unit of the recommending device 402 in the third embodiment is functionally completely the same as each corresponding unit of the device 300 in the second embodiment of the present disclosure, and details are not given herein.

In a preferably implementing mode of this embodiment, the client 401 further includes an encrypting unit and an information sending unit (not illustrated), the encrypting unit is configured for encrypting the request for recommending a server, and the information sending unit is configured for sending the request for recommending a server encrypted by the encrypting unit to the request receiving unit 4021 of the recommending device 402. As a preferable mode, the request receiving unit 4021 further includes a decrypting unit (not illustrated), and the decrypting unit is configured for decrypting the request for recommending a server received by the request receiving unit 4021 so as to obtain an IP address of the client 401 and the account information of the user of the client 401 through decrypting.

In a preferable mode of this embodiment, the client 401 is configured for selecting an IP address from the IP address list for carrying out an access attempt after the IP address list is received from the sending unit 4024 in the recommending device 402. For example, the client 401 may select an IP address with the highest ranking from the IP address list to carry out an access attempt; if the client 401 successfully accesses the recommended server, the client 401 may interact with business data (such as data relevant to game applications) with the recommended server; if the client 401 does not successfully access the recommended server, the client 401 further may select an IP address with secondarily highest ranking from the IP address list to carry out an access attempt; and if the client 401 does not still successfully access the recommended server, an IP addresses with lower ranking may be selected successively as mentioned previously till the client 401 successfully accesses the recommended server or all IP addresses in the IP address list are selected.

The client in the above embodiments may be a software client, such as a web browser or a game application client displaying a web interface, and also may be a hardware client, such as a desk computer, a knee computer, a handheld computer, a personal digital assistant (PDA), a handheld electronic processing device, an intelligent mobile phone combined with PDA and mobile phone functions, an iPod, an iPod/MP3 player, or any other electronic devices capable of automatically processing information (such as web information) and displaying the information. The client may be connected with the server or another client in a wired manner or a wireless manner.

The embodiment of the present disclosure provides a non-transitory storage medium including computer-executable instructions which, when executed by a computer processor, are used to execute steps of:

receiving a request for recommending a server from a client, wherein the request for recommending a server includes an IP address of the client and account information of a user of the client;

designating a recommended server according to the IP address and the account information;

ranking a plurality of IP addresses associated with the recommended server according to ranking parameters so as to generate an IP address list composed of the ranked IP addresses, wherein the IP addresses associated with the recommended server include a local IP address of the recommended server and IP addresses of transit servers which have accessed the recommended server; and sending the IP address list to the client.

Optionally, the ranking parameters include ranking items and weighed values, wherein the ranking items include: whether to be within the same geological region as the client, whether to belong to the same network operator providing network services to the client, and whether to be the local IP address of the recommended server.

Optionally, the step of designating the recommended server according to the IP address and the account information includes: identifying the geological region where the client is and the network operator providing network services to the client according to the IP address; and designating the recommended server according to the geological region, the network operator and the account information.

Optionally, the account information of the user includes one or more of: account information used for logging in of a user, verification-relevant information, identity-relevant information and applications-relevant information used by the user.

An ordinary person skilled in the art can understand and realize that all or partial steps in the implementing mode of the method can be completed by instructing relevant hardware through a program, wherein the program can be stored in a computer readable storage medium, such as an ROM/RAM (read-only memory)/(Random Access Memory), a diskette and an optical disk.

According to the technical scheme of the present disclosure, the recommended server may be designated among the servers capable of providing services to the client at present, and then the IP addresses associated with the designated recommended server are ranked, so that the higher the IP address ranks, the higher the probability of being selected by the client for carrying out an access attempt of the recommended server is, and whether the server is recommended or the ranking of the IP addresses are both performed based on the factors such as geographical regions, operators and local IP addresses of servers; and therefore, the client accesses the nearby servers, and network flow is saved.

It is noted that the above is just better embodiments and applied technical principles of the present disclosure. A person skilled in the art can understand that the present disclosure is not limited to the specific embodiments herein, and may carry out various obvious changes, readjustment and replacement without breaking away from the scope of protection of the present disclosure. Therefore, the present disclosure is described in details through the above embodiments, but the present disclosure is not just limited to the above embodiments, and under the condition of not breaking away from the present disclosure, the present disclosure further may include more other equivalent embodiments which should be in a scope expressed by attaching claims.

What is claimed is:

1. A method for recommending a server to a client, comprising:
    receiving a request for recommending a server from a client, wherein the request for recommending a server comprises an IP address of the client and account information of a user of the client;
    designating a recommended server according to the IP address and the account information;
    ranking a plurality of IP addresses associated with the recommended server according to ranking parameters so as to generate an IP address list composed of the ranked IP addresses, wherein the IP addresses associated with the recommended server comprise a local IP address of the recommended server and IP addresses of transit servers which have accessed the recommended server; and
    sending the IP address list to the client;
    wherein the ranking parameters comprise ranking items and respective weighed values of the ranking items, and the ranking items comprise: whether to be within the same geological region as the client, whether to belong to the same network operator providing network services to the client, and whether to be the local IP address of the recommended server.

2. The method according to claim 1, wherein designating the recommended server according to the IP address and the account information comprises: identifying the geological region where the client is and the network operator for providing network services to the client according to the IP address; and designating the recommended server according to the geological region, the network operator and the account information.

3. The method according to claim 1, wherein the account information of the user comprises one or more of: account information used for logging in of a user, verification-related information, identity-related information, and information related to an application used by the user.

4. A system for recommending a server to a client, comprising:
    a client, configured for sending a request for recommending a server to a recommending device, wherein the request for recommending a server comprises an IP address of the client and account information of a user of the client; and
    a commending device, comprising:
    a computer readable storage medium;
    at least one processor operatively associated with the storage medium; a plurality of program units stored in the computer readable storage and configured to be executed by the at least one processor, wherein the plurality of program units comprise:
    a request receiving unit, a designating unit, a ranking unit and a sending unit, wherein
    the request receiving unit is configured for receiving the request for recommending a server from the client;
    the designating unit is configured for designating the recommended server according to the IP address and the account information in the request for recommending a server;
    the ranking unit is configured for ranking a plurality of IP addresses associated with the recommended server according to the ranking parameters so as to generate an IP address list composed of the ranked IP addresses, wherein the IP addresses associated with the recommended server comprise a local IP address of the recommended server and IP addresses of transit servers which have accessed the recommended server; and
    the sending unit is configured for sending the IP address list to the client;
    wherein the ranking parameters comprise ranking items and the respective weighed values of the ranking items, and the ranking items comprise: whether to be within the same geological region as the client, whether to belong to the same network operator providing network services to the client, and whether to be the local IP address of the recommended server.

5. The system according to claim 4, wherein the designating unit is specifically configured for: identifying the geological region where the client is and the network operator for providing network services to the client according to the IP address; and designating the recommended server according to the geological region, the network operator and the account information.

6. The system according to claim 4, wherein the account information of the user comprises one or more of: account information used for logging in of a user, verification-relevant information, identity-relevant information, and information relevant to an application used by the user.

7. The system according to claim 4, wherein the client further comprises an encrypting unit and an information sending unit, wherein the encrypting unit is configured for encrypting the request for recommending a server, and the information sending unit is configured for sending the request for recommending a server encrypted by the encrypting unit to the request receiving unit of the recommending device.

8. The system according to claim 7, wherein the request receiving unit further comprises a decrypting unit which is configured for decrypting the received request for recommending a server so as to obtain the decrypted IP address of the client and the decrypted account information of the user of the client.

9. The system according to claim 4, wherein after receiving the IP address list, the client selects the IP address from the IP address list according to ranking to carry out an access attempt.

10. A server, which comprises at least a processor operating in conjunction with a memory and a plurality of units, wherein the plurality of units comprise:

a request receiving unit, configured for receiving a request for recommending a server from the client, wherein the request for recommending a server comprises an IP address of the client and account information of the user of the client;

a designating unit, configured for designating a recommended server according to the IP address and the account information;

a ranking unit, configured for ranking a plurality of IP addresses associated with the recommended server according to the ranking parameters so as to generate an IP address list composed of the ranked IP addresses, wherein the IP addresses associated with the recommended server comprise a local IP address of the recommended server and IP addresses of transit servers which have accessed the recommended server; and a sending unit, configured for sending the IP address list to the client;

wherein the ranking parameters comprise ranking items and the respective weighed values of the ranking items, wherein the ranking items comprise: whether to be within the same geological region as the client, whether to belong to the same network operator for providing network services to the client, and whether to be the local IP address of the recommended server.

11. The server according to claim 10, wherein the designating unit is further configured for: identifying a geological region where the client is and a network operator for providing network services to the client according to the IP address; and designating the recommended server according to the geological region, the network operator and the account information.

12. The server according to claim 10, wherein the account information of the user comprises one or more of: account information used for logging in of a user, verification-relevant information, identity-relevant information, and information relevant to an application used by the user.

* * * * *